United States Patent Office 2,974,180
Patented Mar. 7, 1961

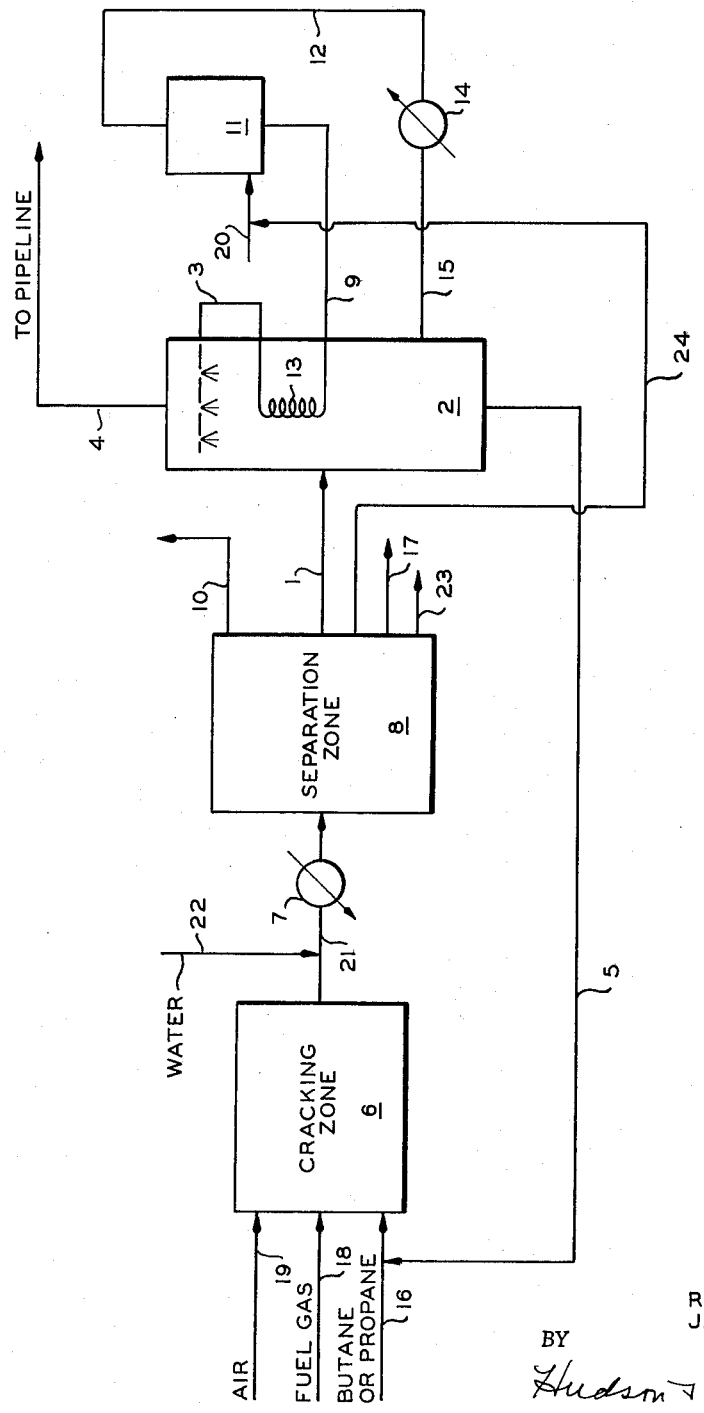

2,974,180

PRODUCTION AND PURIFICATION OF ACETYLENE

Robert A. Koble and Joseph R. Cobb, Jr., Bartlesville, Okla., assignors to Phillips Petroleum Company, a corporation of Delaware Filed Dec. 10, 1957, Ser. No. 701,826

33 Claims. (Cl. 260—679)

This invention relates to production and purification of acetylene. In one of its aspects, the invention relates to the contacting of gases containing acetylene and gases higher boiling than acetylene with a liquefied normally gaseous hydrocarbon to absorb said higher-boiling gases from said acetylene, recovering acetylene as a product and passing said liquefied normally gaseous hydrocarbon containing said higher-boiling gases to an acetylene-producing zone, therein converting said higher-boiling gases and said liquefied normally gaseous hydrocarbon, under conversion conditions, to produce acetylene containing gases, recovering unconverted normally gaseous hydrocarbon which can be used as said liquefied normally gaseous hydrocarbon after suitable liquefaction, and gases containing acetylene and gases higher boiling than acetylene and passing said gases into contact with liquefied normally gaseous hydrocarbon for absorption of said gases higher boiling than acetylene, as described. In another of its aspects, the invention relates to the absorption from a gas containing acetylene and gases higher boiling than acetylene, the gases higher boiling than acetylene by contacting the gaseous mixture with a liquefied normally gaseous hydrocarbon under conditions such that at least a portion of the liquefied normally gaseous hydrocarbon is vaporized and passes from the contacting zone together with the acetylene as a diluent therefor. In a still further aspect of the invention, liquefied normally gaseous hydrocarbon is, in part, vaporized to produce vaporized normally gaseous hydrocarbon which is used to strip unavoidably absorbed acetylene from said liquefied normally gaseous hydrocarbon after it has been contacted with the gaseous mixture to remove therefrom the said gases higher boiling than acetylene. Further, in another aspect of the invention, it relates to an operation, as described, wherein the cooled liquid normally gaseous hydrocarbon obtained upon said vaporization is used either directly by injection into the contacting zone or by indirect heat exchange therein to cool the said zone wherein said higher-boiling gases are being absorbed in said liquefied normally gaseous hydrocarbon and further, in another aspect, the now warmed liquefied, normally gaseous hydrocarbon, thus heat-interchanged, is used in the acetylene outlet end of the contacting zone as the said diluent.

It is known to crack a normally gaseous hydrocarbon such as butane and/or propane to produce acetylene containing gases and to recover acetylene from said gases. Still further, it is known to employ a liquid hydrocarbon such as hexane to separate acetylene and ethylene from a gaseous mixture containing them and hydrogen and methane. Still further, it is known to separate diacetylene from acetylene by washing gases containing them with higher liquid members of the paraffinic and olefinic series of hydrocarbon. It is also known to employ liquefied normally gaseous hydrocarbon to absorb an olefin hydrocarbon from a gas containing the same.

We have conceived certain specific concepts among which are principally the following. Acetylene is recovered from a gas containing the same and gases higher boiling than acetylene by absorbing from said gases the said higher-boiling gases by contacting the gaseous mixture with a liquefied normally gaseous hydrocarbon, thus obtaining a stream containing liquefied normally gaseous hydrocarbon and said gases higher boiling than acetylene, and then passing said stream to a hydrocarbon conversion zone, wherein under acetylene-producing conditions, the said higher-boiling gases and the said normally gaseous hydrocarbon are converted to produce additional quantities of gases containing acetylene. Further, some of the liquefied normally gaseous hydrocarbon absorbent is allowed to vaporize from the absorption zone together with the purified acetylene leaving said zone to act as a diluent for said acetylene which can be transported by way of pipe line. Furthermore, in view of the combination of several of the concepts of the invention, the converted gases can be fractionated to recover unconverted normally gaseous hydrocarbon which can be liquefied and reused as said liquefied normally gaseous hydrocarbon. Still further, at least a portion of the normally gaseous hydrocarbon as a gas can be introduced to the absorber zone to strip from the enriched absorbent, acetylene unavoidably absorbed therein. Another more specific concept is found in the use of liquid normally gaseous hydrocarbon absorbent introduced into the contacting zone in such a manner that a portion of it will vaporize and pass from said zone as diluent for the purified acetylene while the remainder will act as the said liquefied normally gaseous hydrocarbon absorbent passing through said zone to absorb the gases higher boiling than acetylene from the mixture of gases which is fed to said zone.

An object of this invention is the production and purification of acetylene. Another object of the invention is a unitary operation wherein a normally gaseous hydrocarbon is converted to gases containing acetylene and gases higher boiling than acetylene and wherein at least a portion of normally gaseous hydrocarbon is liquefied and used as an absorbent for purifying the acetylene-containing gases. A still further object of the invention is the provision of a purification process for purifying acetylene contained in a mixture of gases together with gases higher boiling than acetylene in such a manner as to obtain pure acetylene diluted with a normally gaseous hydrocarbon.

Other aspects, objects and several advantages of the invention are apparent from a study of this disclosure, the drawing, and the appended claims.

According to the present invention, there are provided a method and apparatus for removing from acetylene containing gases, gases higher boiling than acetylene by contacting the said gases with a liquefied normally gaseous hydrocarbon. Still further, according to the invention, the enriched liquefied normally gaseous hydrocarbon is passed to a conversion zone and therein converted under acetylene-producing conditions to further quantities of gases containing acetylene, gases boiling higher than acetylene, and unconverted normally gaseous hydrocarbon which is recovered and reused.

Other inventive features of this invention are described in connection with the drawing wherein a mixture of gases containing acetylene and gases boiling higher than acetylene, such as methyl, or heavier, acetylenes, are introduced by way of pipe 1 to tower 2 and therein contacted in countercurrent manner with liquefied butane introduced by way of pipe 3. The tower-top temperature is maintained in the approximate range of from about −20° to about 75° F., in this embodiment at about 32° F. Under these conditions and a pressure maintained just under 4 atmospheres, a portion of the liquefied butane will vaporize and pass from the tower top by way of pipe 4 together with purified acetylene and be passed to pipe line.

The liquid butane passes downwardly absorbing the gases higher boiling than acetylene and ultimately collects at the foot of tower 2 from which it is withdrawn by way of pipe 5 and passed to conversion heater 6 wherein partial oxidation conditions, later more fully set forth, are maintained to convert butane and the said gases higher boiling than acetylene to a gaseous mixture containing acetylene, gases higher boiling than acetylene and unconverted butane. These gases are passed from heater 6 to separation zone 8, from which gases containing acetylene and gases higher boiling than acetylene are taken to tower 2. Residue gases are removed from the process by way of pipe 10. Fresh liquid butane is introduced via pipe 20 to vaporizer 11, from which butane vapor is passed by way of pipe 12, trim heater 14, and pipe 15 to the bottom of tower 2 to therein act as stripping agent to strip from the liquid butane acetylene unavoidably absorbed therein. Liquid butane is passed from the bottom of vaporizer 11 by way of pipe 9 and cooling coil 13, to pipe 3 for use as above described. Cooler 13 will maintain the temperature of the mid-portion of the column, slightly cooler than the top temperature. The bottom temperature of the column is maintained at about 85–110° F. It will be recognized by those skilled in the art in possession of this disclosure that this operation neatly accomplishes the absorption from the acetylene of the gases higher boiling than acetylene as well as the production of acetylene diluted for pipe line transportation. Additional quantities of butane can be added by way of pipe 16 to serve as additional feed for conversion heater 6. During the conversion operation in conversion heater 6, there is unavoidably formed some higher boiling material which separates in separation zone 8 as an oil and is withdrawn therefrom by way of pipe 17. Also, due to the fact that fuel gas and air are introduced to heater 6 by way of pipes 18 and 19 respectively, water is formed which is also removed by way of pipe 23.

In lieu of cooling coil 13, it is within the scope of the invention to directly inject at least a portion of the liquid butane directly into the mid-portion of column 2.

It is also within the scope of the invention to separate unreacted butane from the cracking zone effluent and to use the same as at least a portion of the absorbent supplied via line 20. Thus, butane recovered in zone 8 can be passed via line 24 to line 20, if desired.

It will be noted upon study of the foregoing disclosure that the process possesses the advantages of producing refrigeration available for intercooler duty in the tower by merely flashing the butane feed to a lower pressure in vaporizer 11. The butane is already under pressure and is used as stripping medium and, therefore, no external stripping medium is required. Also, by obtaining the gases boiling higher than acetylene from the gases in column 2, according to the Le Chatelier-Braun principle, the presence of heavy acetylenes in the cracking reactor feed is assured and will, to this extent, reduce the net production of these components, thus increasing the net acetylene yield. Importantly, explosion hazard usually accompanying heavy acetylene stripping is eliminated. Furthermore, a unique feature of the method is that the absorbent is cooled by vaporization of itself into the product stream and, therefore, is self-cooled to an extent which more than offsets the heat of absorption in column 2. Thus, in one alternative of the invention, it is possible to dispense entirely with intercoolers or cooling coils such as coil 13. This, of course, will depend upon the extent of dilution which can desirably be accepted for the acetylene as it goes to pipe line or other utilization. It is obvious that there is no problem presented by the separation at the place of utilization of butane from the acetylene. In the first place, the butane is essentially nonreactive and, therefore, chemical operations can be conducted in its presence to recover the same substantially unreacted. Still further, the boiling point of normal butane being approximately 0.5° C. and that of acetylene being −83.6° C., it is clear that separation by fractionation can readily be accomplished.

It will be understood by one skilled in the art in possession of this disclosure that in the drawing there have been illustrated and described certain elements with which the invention can be readily explained. However, the showing of some elements in the drawing does not preclude their insertion elsewhere in practical execution of the invention. Furthermore, the absence from the drawing of details of construction or such elements as valves, pumps, etc. can be supplied routinely by one skilled in the art in possession of this disclosure and have been omitted for sake of simplicity.

EXAMPLE 1

*Butane cracking (100% conversion)*

| | | Lb./hr. |
|---|---|---|
| Feed rates: | | |
| Make-up butane (16) | | 3,740 |
| Fuel gas (18) | | 10,937 |
| Air (19) | | 159,769 |
| Reactor effluent (7) | | 207,171 |
| Components— | | |
| CO | wt. percent | 4.90 |
| $CO_2$ | do | 9.65 |
| Nitrogen | do | 60.00 |
| $H_2$ | do | 1.40 |
| Methane | do | 3.42 |
| Acetylene | do | 7.55 |
| Ethylene | do | 2.26 |
| Methyl acetylene | do | 2.30 |
| Diacetylene | do | .49 |
| Vinyl acetylene | do | .25 |
| $H_2O$ | do | 7.65 |
| Residue gas (10) | | 173,911 |
| Components— | | |
| CO | wt. percent | 6.1 |
| $CO_2$ | do | 11.6 |
| Nitrogen | do | 73.3 |
| $H_2$ | do | 1.7 |
| Methane | do | 4.2 |
| Acetylene | do | 0.1 |
| Ethylene | do | 2.7 |
| Bottoms from separation zone (17) | | 15,677 |
| Composition— | | |
| Heavy oil | wt. percent | Trace |
| Water | do | 99.9+ |
| Feed to absorption zone (1) | | 17,583 |
| Composition— | | |
| $CO_2$ | wt. percent | 1.8 |
| Acetylene | do | 86.8 |
| Methyl acetylene | do | 2.6 |
| Diacetylene | do | 5.7 |
| Vinyl acetylene | do | 3.3 |
| Butane to absorption zone (liquid) (3) | | 40,600 |
| Butane to absorption zone (vapor) (15) | | 4,060 |
| Total butane to vaporizer (20) | | 44,660 |
| Pipeline acetylene (4) | | 29,518 |
| Components— | | |
| CO | wt. percent | 1.10 |
| Acetylene | do | 51.00 |
| Methyl acetylene | do | 0.07 |
| Diacetylene | do | 0.15 |
| Vinyl acetylene | do | 0.15 |
| Butane | do | 47.60 |
| Recycle Bottoms to Cracking Zone (5) | | 32,725 |
| Components— | | |
| Acetylene | wt. percent | .46 |
| Methyl acetylene | do | 1.42 |
| Diacetylene | do | 3.06 |
| Vinyl acetylene | do | 1.57 |
| Butane | do | 93.50 |
| Temperatures: | | ° F. |
| Conversion heater (6) | | 2200–2600 |
| Absorber (2)— | | |
| Inlet | | 42 |
| Top | | 32 |
| Bottom | | 100 |
| Vaporizer (11) | | 102 |
| Liquid butane to absorption zone (3) | | 55 |
| Butane vapor to absorption zone (15) | | 102 |
| Pressures: | | P.s.i.a. |
| Conversion zone (6) | | 15 |
| Absorber (2) | | 50 |
| Vaporizer (11) | | 55 |

EXAMPLE 2

*Propane cracking (80% conversion)*

Propane is subjected to cracking conditions substantially as employed in Example 1. After the fractionation of the cracking zone effluent, so as to remove the residue gases and heavy oils therefrom, the acetylene-rich stream is passed to a propane absorption zone. As in Example 1, the propane removes substantially all of the heavier-than-acetylene hydrocarbons and the remaining acetylene is diluted with propane for pipeline use. The following are the absorption zone operation conditions with the reference numbers being taken from the drawing.

| Flow rates: | Lbs./hr. |
|---|---|
| Feed to absorption zone (1) | 35,032 |
| Composition— | |
| Acetylene_____wt. percent__ 80.5 | |
| Methyl acetylene_____do____ 2.5 | |
| Propane_____do____ 12.6 | |
| Diacetylene_____do____ 1.3 | |
| Vinyl acetylene_____do____ 2.4 | |
| Butadiene_____do____ 0.7 | |
| Propane to vaporizer (20) | 44,000 |
| Propane to absorption zone (liquid) (3) | 33,000 |
| Propane to absorption zone (vapor) (15) | 11,000 |
| Pipeline acetylene (4) | 50,392 |
| Composition— | |
| Acetylene_____wt. percent__ 53.8 | |
| Propane_____do____ 46.2 | |
| Recycle to cracking zone (5) | 28,640 |
| Composition— | |
| Acetylene_____wt. percent__ 4.6 | |
| Methyl acetylene_____do____ 2.9 | |
| Propane_____do____ 87.5 | |
| Diacetylene_____do____ 1.6 | |
| Vinyl acetylene_____do____ 2.7 | |
| Butadiene_____do____ .7 | |

| Temperatures: | °F. |
|---|---|
| Absorption zone (2)— | |
| Top | −15 |
| Bottom | +52 |
| Feed (1) | 3 |
| Propane vapor to absorption zone (15) | 60 |
| Liquid propane to absorption zone (3) | 0 |
| Vaporizer (11) | 60 |

| Pressures: | P.s.i.a. |
|---|---|
| Absorption zone (2) | 100 |
| Vaporizer (11) | 110 |

Reasonable variation and modification are possible within the scope of the foregoing disclosure, the drawing and the appended claims to the invention, the essence of which is that a liquefied normally gaseous hydrocarbon is employed to separate from acetylene, gases which are higher boiling than acetylene, the enriched liquid hydrocarbon being passed to a conversion zone and therein converted to produce additional gases containing acetylene, gases higher boiling than acetylene, and unconverted gaseous hydrocarbon which is recovered; that an absorption zone is so operated with a liquefied normally gaseous hydrocarbon that at least a portion of it vaporizes and leaves together with purified acetylene produced therein, rendering the acetylene suitable for pipe line transportation and further use; that a normally gaseous hydrocarbon, preferably the same as liquefied and employed as the said liquefied normally gaseous hydrocarbon, is employed as a stripping agent for the absorber zone; and that an apparatus for accomplishing the aforesaid steps has been provided.

We claim:

1. The removal from a stream of acetylene-containing gases of gases higher boiling than acetylene which comprises feeding said stream of gas to an intermediate point of an absorption zone, feeding a liquefied, normally gaseous hydrocarbon absorbent to an end portion of said zone, in said zone passing said stream and said hydrocarbon in countercurrent contact relationship with each other, removing from said end portion of said zone acetylene, substantially free from said gases higher boiling than acetylene, together with some now vaporized normally gaseous hydrocarbon, and passing the remainder of said liquefied, normally gaseous hydrocarbon and gases higher boiling than acetylene contained therein toward the other end of said zone, and there removing said liquefied normally gaseous hydrocarbon and said gases contained therein from said zone.

2. A method according to claim 1 wherein normally gaseous hydrocarbon is introduced into said other end of said zone to strip unavoidably absorbed acetylene from said liquefied, normally gaseous hydrocarbon which contains said gases higher boiling than acetylene.

3. A method according to claim 1 wherein said liquefied, normally gaseous hydrocarbon is at least partly vaporized to cool the same, is passed into indirect contact with the gases and absorbent in an intermediate portion of said zone and is then passed into the said first end of said zone to provide at least a portion of said absorbent and at least a portion of said vaporized, normally gaseous hydrocarbon which is removed from said zone with the acetylene in admixture therewith.

4. A method according to claim 1 wherein the liquefied, normally gaseous hydrocarbon and gases absorbed therein are passed directly to an acetylene-producing zone.

5. A method according to claim 4 wherein acetylene-containing gases from the acetylene-producing zone are passed to said absorption zone and unconverted normally gaseous hydrocarbon is recovered, liquified and used as said liquefied, normally gaseous hydrocarbon absorbent.

6. A method according to claim 1 wherein said liquefied, normally gaseous hydrocarbon is butane.

7. A method for the purification of acetylene-containing gases to produce acetylene free from gases higher boiling than acetylene, such as methyl and heavier acetylenes, obtaining the acetylene in a condition for pipe line transportation, which comprises feeding said gases to an intermediate point of an absorption column, passing said gases in said column upwardly in counter-current flow with a downwardly flowing liquefied, normally gaseous hydrocarbon absorbent; maintaining the top of said column at a temperature under existing pressure such that a portion of said absorbent will leave the top of the column as a gas together with purified acetylene also taken from the top of said tower; passing cooled absorbent into indirect heat exchange with the gases and absorbent in a mid-portion of said column, and then passing said cooled, now warmed, absorbent into the top of said column as at least a portion of the absorbent used in said column and to at least, in part, maintain the top of said column at said temperature; passing a vaporous portion of said absorbent hydrocarbon into the bottom of said column to strip from enriched absorbent therein unavoidably absorbed acetylene; and removing from the bottom of said column said enriched absorbent containing said gases higher boiling than said acetylene.

8. A method according to claim 7 wherein the pressure in said column is not in excess of four atmospheres, the top temperature is in the range −20−75° F., the mid-portion of the column is colder than the top of the column and the bottom temperature of the column is in the range of 85−100° F.

9. A method according to claim 1 wherein the removed liquefied, normally gaseous hydrocarbon and said gases contained therein, are passed into a conversion zone wherein said normally gaseous hydrocarbon and gases contained therein are subjected to conditions of time, temperature and pressure so as to form acetylene and said gases are passed to said absorption zone as the gases containing acetylene and gases higher boiling than acetylene.

10. A method of producing and recovering acetylene which comprises contacting gases containing acetylene and gases boiling higher than acetylene with a liquefied normally gaseous hydrocarbon to absorb from said gases the gases higher boiling than acetylene, resulting in an acetylene product and passing the remainder of said gases in admixture with said liquefied normally gaseous hydrocarbon to a conversion zone and therein, under acetylene-producing conditions, converting said gases and said liquefied normally gaseous hydrocarbon to produce additional quantities of acetylene, recovering unconverted normally gaseous hydrocarbon which can be used as said liquefied normally gaseous hydrocarbon, and passing the gases thus obtained as the gases containing acetylene and the gases higher boiling than acetylene to said contacting for recovery of acetylene therefrom.

11. A method according to claim 1 wherein the stream of acetylene-containing gases contains also a minor proportion of butane.

12. A method according to claim 2 wherein the normally gaseous hydrocarbon is butane.

13. A method according to claim 3 wherein the normally gaseous hydrocarbon is butane.

14. A method according to claim 7 wherein the normally gaseous hydrocarbon is butane.

15. A method according to claim 9 wherein the normally gaseous hydrocarbon is butane.

16. A method according to claim 10 wherein the normally gaseous hydrocarbon is butane.

17. A method according to claim 10 wherein the conversion zone is a partial oxidation zone.

18. A method according to claim 1 wherein said liquefied, normally gaseous hydrocarbon is propane.

19. A method according to claim 1 wherein the stream of acetylene-containing gases contain also a minor proportion of propane.

20. A method according to claim 2 wherein the normally gaseous hydrocarbon is propane.

21. A method according to claim 3 wherein the normally gaseous hydrocarbon is propane.

22. A method according to claim 7 wherein the normally gaseous hydrocarbon is propane.

23. A method according to claim 9 wherein the normally gaseous hydrocarbon is propane.

24. A method according to claim 10 wherein the normally gaseous hydrocarbon is propane.

25. A method according to claim 1 wherein said liquefied, normally gaseous hydrocarbon is a mixture of propane and butane.

26. A method according to claim 1 wherein the stream of acetylene containing gases contain also a minor proportion of propane and butane.

27. A method according to claim 2 wherein the normally gaseous hydrocarbon is a mixture of propane and butane.

28. A method according to claim 3 wherein the normally gaseous hydrocarbon is a mixture of propane and butane.

29. A method according to claim 7 wherein the normally gaseous hydrocarbon is a mixture of propane and butane.

30. A method according to claim 9 wherein the normally gaseous hydrocarbon is a mixture of propane and butane.

31. A method according to claim 10 wherein the normally gaseous hydrocarbon is a mixture of propane and butane.

32. An apparatus suitable for separating acetylene contained in gases also containing gases higher boiling than acetylene which comprises in combination an absorber column, comprising a contact chamber, a conduit for feeding gases to a mid-portion of said chamber, a conduit for removing overhead gases from said chamber, a conduit for removing enriched absorbent from the foot of said chamber, a tank for vaporizing liquid normally gaseous hydrocarbon, a conduit communicating with the upper end of said tank and with the inside of the lower portion of said chamber, below the point of feed of said gases for introducing vaporized normally gaseous hydrocarbon as a stripping vapor to said chamber, a cooling coil located in said chamber at a mid-point thereof, means for passing cooled liquid hydrocarbon from said tank into said cooling coil, comprising a conduit communicating with the lower end of said tank and with said cooling coil and means for passing liquid and vaporous hydrocarbon from within said cooling coil into the top of said chamber.

33. A method for the purification of acetylene-containing gases to produce acetylene free from gases higher boiling than acetylene, such as methyl and heavier acetylene, obtaining the acetylene in condition for pipeline transportation, which comprises feeding said gases to an intermediate point of an absorption column, passing said gases in said column upwardly in countercurrent flow with a downwardly flowing liquefied, normally gaseous hydrocarbon absorbent, maintaining the top of said column at a temperature under existing pressure such that a portion of said absorbent will leave the top of the column as a gas together with purified acetylene also taken from the top of said tower; maintaining a mid-portion of said column cooler than the top of said column; and removing from the bottom of said column said absorbent enriched with gases higher boiling than acetylene.

References Cited in the file of this patent

UNITED STATES PATENTS

| | | |
|---|---|---|
| 1,549,236 | Van Nuys | Aug. 11, 1924 |
| 1,938,991 | Wulff | Dec. 12, 1933 |
| 1,959,884 | Van Nuys | May 22, 1934 |
| 1,988,032 | Bauman | Jan. 15, 1935 |
| 2,183,148 | Murphree | Dec. 12, 1939 |
| 2,321,666 | Felbeck | June 15, 1943 |
| 2,501,999 | Fausek et al. | Mar. 28, 1950 |
| 2,659,453 | Robinson | Nov. 17, 1953 |
| 2,787,335 | Irvine | Apr. 2, 1957 |
| 2,834,431 | Fauser | May 13, 1958 |
| 2,857,018 | Patridge et al. | Oct. 21, 1958 |